(12) United States Patent
Hodgson

(10) Patent No.: US 6,382,877 B1
(45) Date of Patent: May 7, 2002

(54) METHOD OF INSTALLING REPLACEMENT PIPE AND APPARATUS THEREFOR

(75) Inventor: Alistair Hodgson, Barnsley (GB)

(73) Assignee: Kenton Utilities and Developments LTD, Barnsley (GB)

( * ) Notice: Subject to any disclaimer, the term of this patent is extended or adjusted under 35 U.S.C. 154(b) by 0 days.

(21) Appl. No.: 09/182,541

(22) Filed: Oct. 29, 1998

(51) Int. Cl.[7] .................................................. F16L 55/30
(52) U.S. Cl. ........................ 405/184.3; 405/184.2; 405/184; 138/97; 30/92.5
(58) Field of Search .................... 405/157, 156, 405/171, 184; 175/22, 19, 293, 295, 296; 138/97; 30/92.5

(56) References Cited

U.S. PATENT DOCUMENTS

| | | | | |
|---|---|---|---|---|
| 3,181,302 A | * | 5/1965 | Lindsay | 405/156 |
| 4,637,756 A | * | 1/1987 | Boles | 405/184 |
| 5,076,731 A | * | 12/1991 | Luksch | 405/184 |
| 5,078,546 A | * | 1/1992 | Fisk et al. | 405/156 |
| 5,127,481 A | * | 7/1992 | Hesse | 405/156 |
| 5,302,053 A | * | 4/1994 | Moriarty | 405/154 |
| 5,876,152 A | * | 3/1999 | Hesse | 405/184 |

* cited by examiner

Primary Examiner—David Bagnell
Assistant Examiner—Frederick L. Lagman
(74) Attorney, Agent, or Firm—Klauber & Jackson

(57) ABSTRACT

The invention concerns the replacement of underground pipes (52) wherein a former/cutting blade device (10) is pulled along the line of the existing pipe (52) by a cable fed (30) previously into the existing pipe (52). As the device (10) is so pulled it cuts and spreads the existing pipe (52). At the same time a new pipe (26) attached to the rear of the former (12) is pulled into place. The invention is of particular use in the replacement of small size lead water pipes which lead to consumer dwellings, and provides that the cable (30) which must be as large a diameter as possible to take the loads involved, is connected to the former (12) by having a ferrule (28) at one end which is located in a recess (27) in the former (12) so as not to interfere with the former profile. Also, the recess (27) is to the rear of the cutting blade (40) so that the ferrule (28) does not to cause an obstruction to the cutting operation.

5 Claims, 5 Drawing Sheets

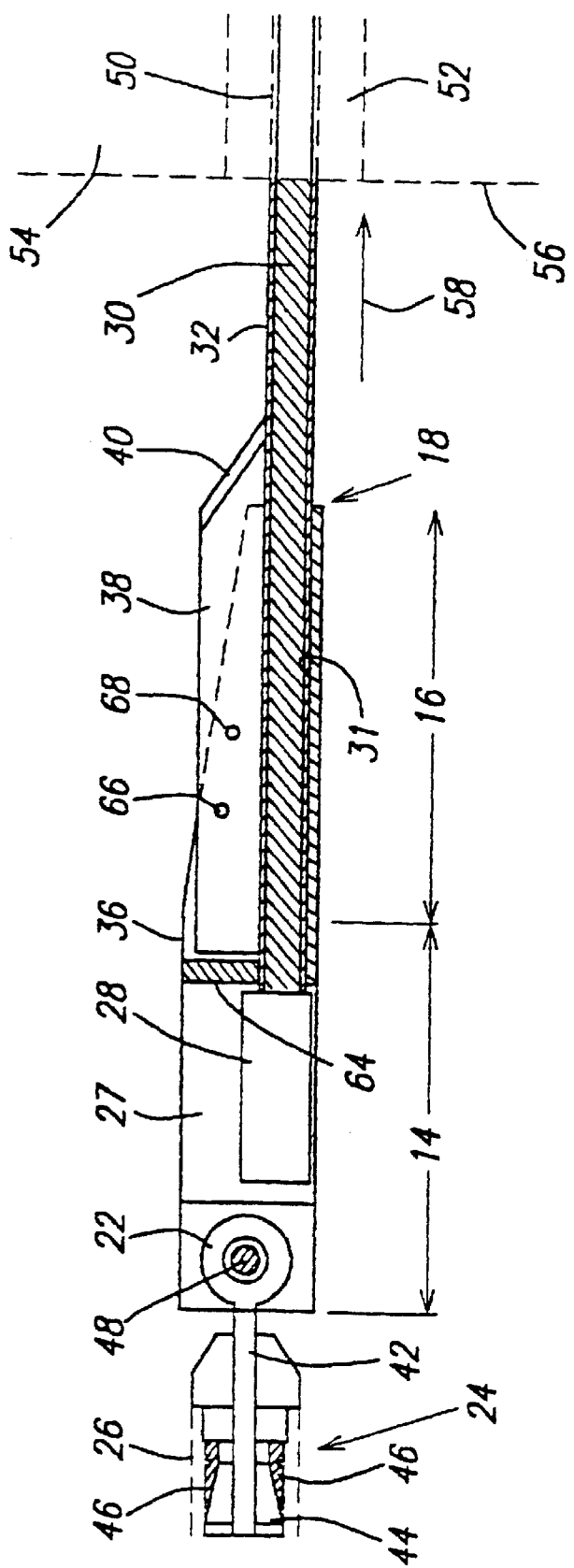
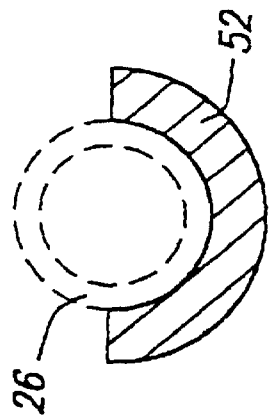
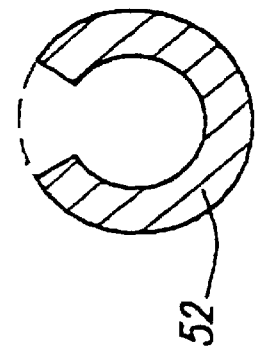
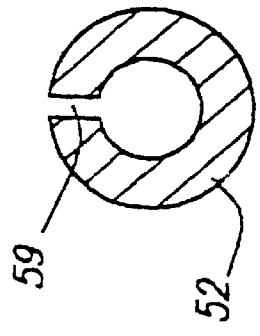

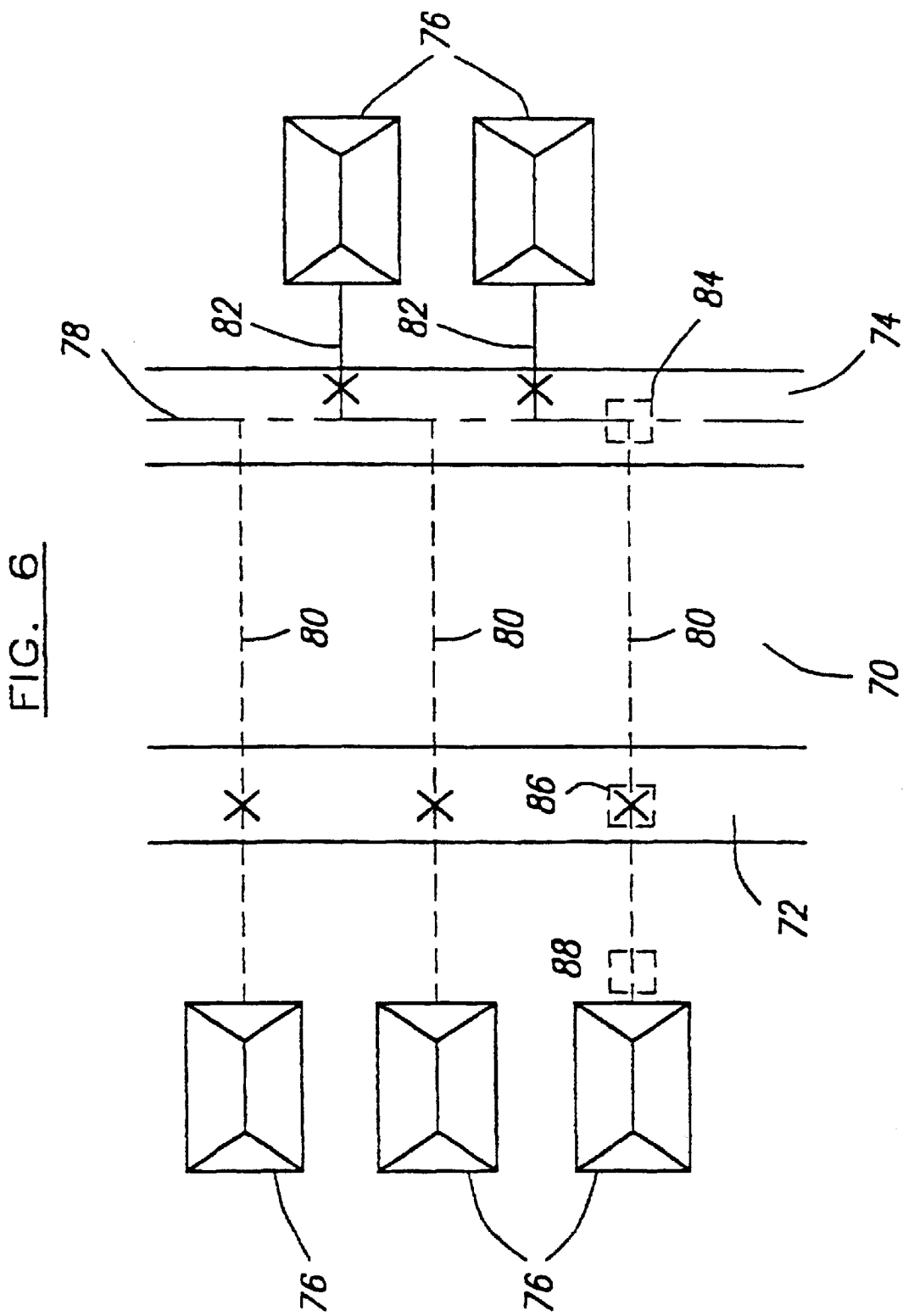

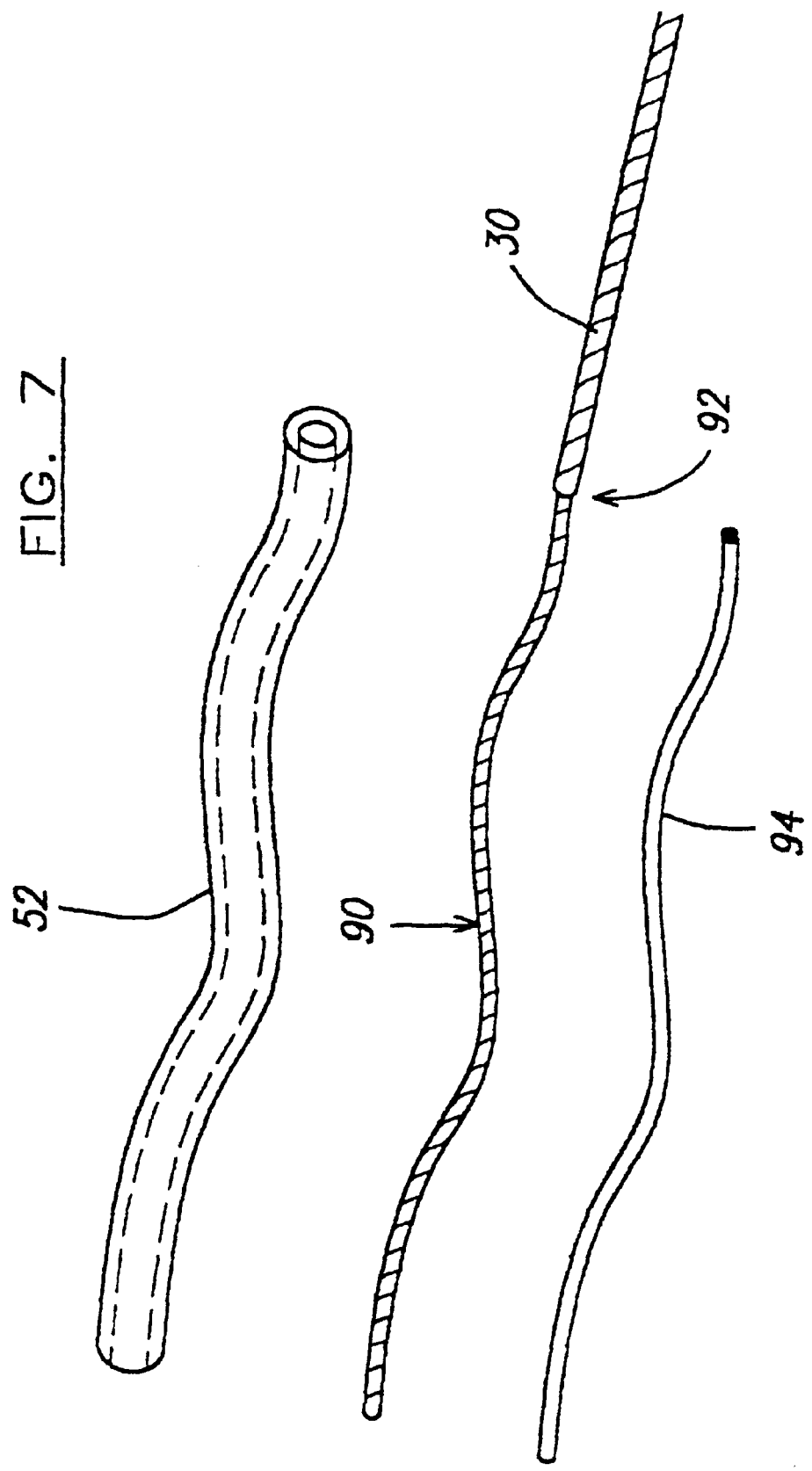

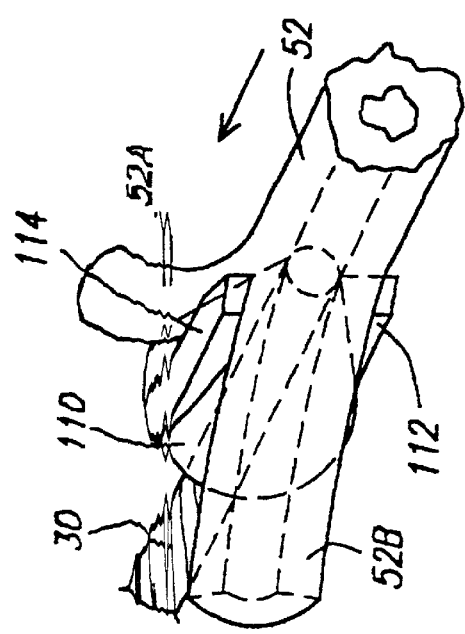
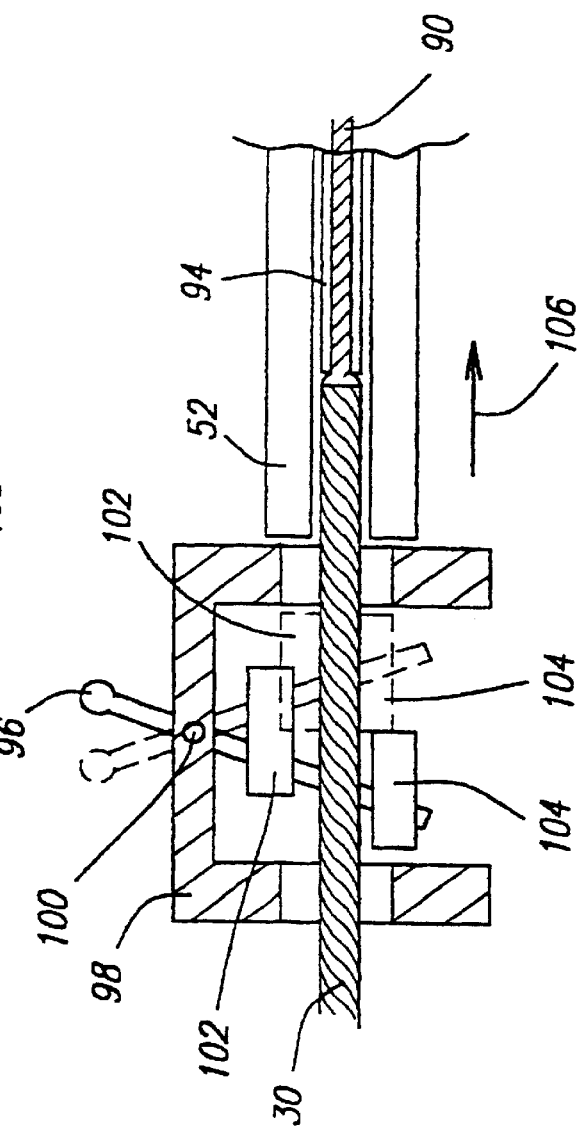
FIG. 8
FIG. 9

METHOD OF INSTALLING REPLACEMENT PIPE AND APPARATUS THEREFOR

This invention concerns the installation of pipes to replace existing underground pipes.

The underground pipes which are to be replaced by the method are relatively small diameter pipes which carry gas or water, for example the service pipe from a main pipe to a consumer, such as a household. Such pipes may be of lead, galvanised steel or plastics, but a particular application for the invention is the replacement of underground lead pipes which ate service pipes carrying water from a main to a consumer.

The are several reasons why it is desirable that lead service pipes should be replaced, including that the ingestion of too much lead is poisonous, and whilst legislation currently allows 0.7 mg/liter in water for drinking purposes, and lead extraction from water pipes falls within this limit, current trends suggest that the limit will be reduced to 0.2 mg/liter, which is less than the current lead levels in drinking water. The lead pipes will therefore have to be replaced, or put out of use, by the installation of a new pipe alongside the old lead pipe.

Secondly, the lead pipes are relatively old (no new lead pipes have been installed for the last 40 years) and many of them are leaking, which means that water is being lost. With water becoming mote important in terms of preservation, this leakage problem must be and is being addressed by water companies. An effective means of reducing the leakage is desired. Replacement of the lead pipes forms a means for achieving this.

The present invention concerns the replacement of pipes by a method and/or means which can put existing lead pipes out of use, and thereby address the leakage problem.

Methods of replacing larger underground pipes have been already proposed, but these suffer from size limitations. For example it is known to pull cutting devices through larger diameter pipes to cut the old pipe along a longitudinal line using a towing cable attached to the front of the cutting device, followed by spreading the slit pipe by means of a former, to the rear of which a new pipe is attached, so that as the former moves along the line of the old pipe, the new pipe is inserted. The known method is suitable for larger diameter pipes in the order of 50 to 250 mm diameter, but the method does not directly scale down to make it suitable for the replacement of water and gas service pipes which are in the order of 30 mm or less.

The present invention also makes use of a cutting device comprising a former and a cutting blade, the blade serving to slit the existing pipe and the former to spread the slit pipe, as the device is pulled along the line of the pipe by a towing cable which is threaded into the existing pipe, and a new pipe is inserted by being attached to the rear of the former, the method in addition comprising using a towing cable which is a relatively neat fit in the bore of the existing pipe, and couples to the cutting device at a position to the rear of the cutting blade, so that the cable in effect pushes the cutting blade along the line of the existing pipe.

This has a significant advantage in the case of small pipes, in that, in size terms, the coupling of the cable to the device is not constrained as it would be if the end of the cable were to be ahead of the cutting blade, as that attachment would have to pass into the bore of the existing pipe ahead of the cutting blade. This would make cutting of small diameter pipes impossible.

In a preferred method, the end of the cable is coupled to the cutting device by being provided with an enlarged portion, for example provided by a ferrule, which is clamped on to the end of the cable and the former has a recess in which the ferrule is received, so that the presence of the ferrule does not alter the outer profile of the former, which should be smooth to perform the spreading of the slit pipe.

Preferably, the former has a passage leading from the front end to the recess, and the cable is coupled to the former by being threaded through the recess and then the passage until the ferrule seats on a shoulder of the recess and can go no further. The cable emerges from the front end of the former and into the pipe to be slit and replaced. The construction of the rear of the former, and the means of attachment of the new replacement pipe may be conventional, as is the nature of the new pipe, which preferably is of polyethylene.

Inside the passage there is preferably a rigid sleeve through which the cable passes, such sleeve serving as a means for providing a supporting reaction to the cutting blade as it cuts through the existing pipe, rather than the reaction being taken by the cable.

As to the cable being a relatively neat fit in the existing pipe, this is important for cable being sufficiently large to withstand the loads involved, but the cable also has to pass through the pipe without snagging. Although the cable can snag if it is too neat a fit, it can also snag if the fit is not sufficiently neat, and it may break under increased load. In this connection, the existing service pipes usually ate not perfectly straight, and often have curves, and rises and falls.

In the use of the method, the former which has a small front end which can enter the bore of the existing pipe, is forced, by pulling the cable where it projects from the remote end of the existing pipe, into the bore of the pipe. Eventually, the cutting blade engages the pipe and starts to slit the pipe. The larger rear of the former then enters the pipe and starts to spread it. The former moves along the line of the pipe, pulling in the replacement pipe. In fact, the part of the former in front of the ferrule in the recess, which includes the cutting blade, is pushed by the ferrule along the line of the pipe. Thus the existing pipe is spread ahead of the ferrule, and so there is no interference between the ferrule and the existing pipe, due to the method and means of the invention.

The invention also extends to the provision of a cutting device and a pulling cable combination by which the method can be performed.

An embodiment of the present invention will now be described by way of example with reference to the accompanying drawings, wherein;

FIG. 2 is a sectional elevation of the device and cable according to FIG. 1;

FIGS. 3, 4 and 5 show how an existing pipe is cut and spread using the device according to FIG. 1;

FIG. 6 is a plan view showing a typical location on a highway where the method of the invention would be carried out;

FIG. 7 is a perspective view of how the cable is prepared for carrying out the method of the invention;

FIG. 8 is a perspective view of a special tool for use in unusual circumstances; and FIG. 9 is a view showing how an augmenting tool is used for the insertion of the cable into the existing pipe.

Figure 1:
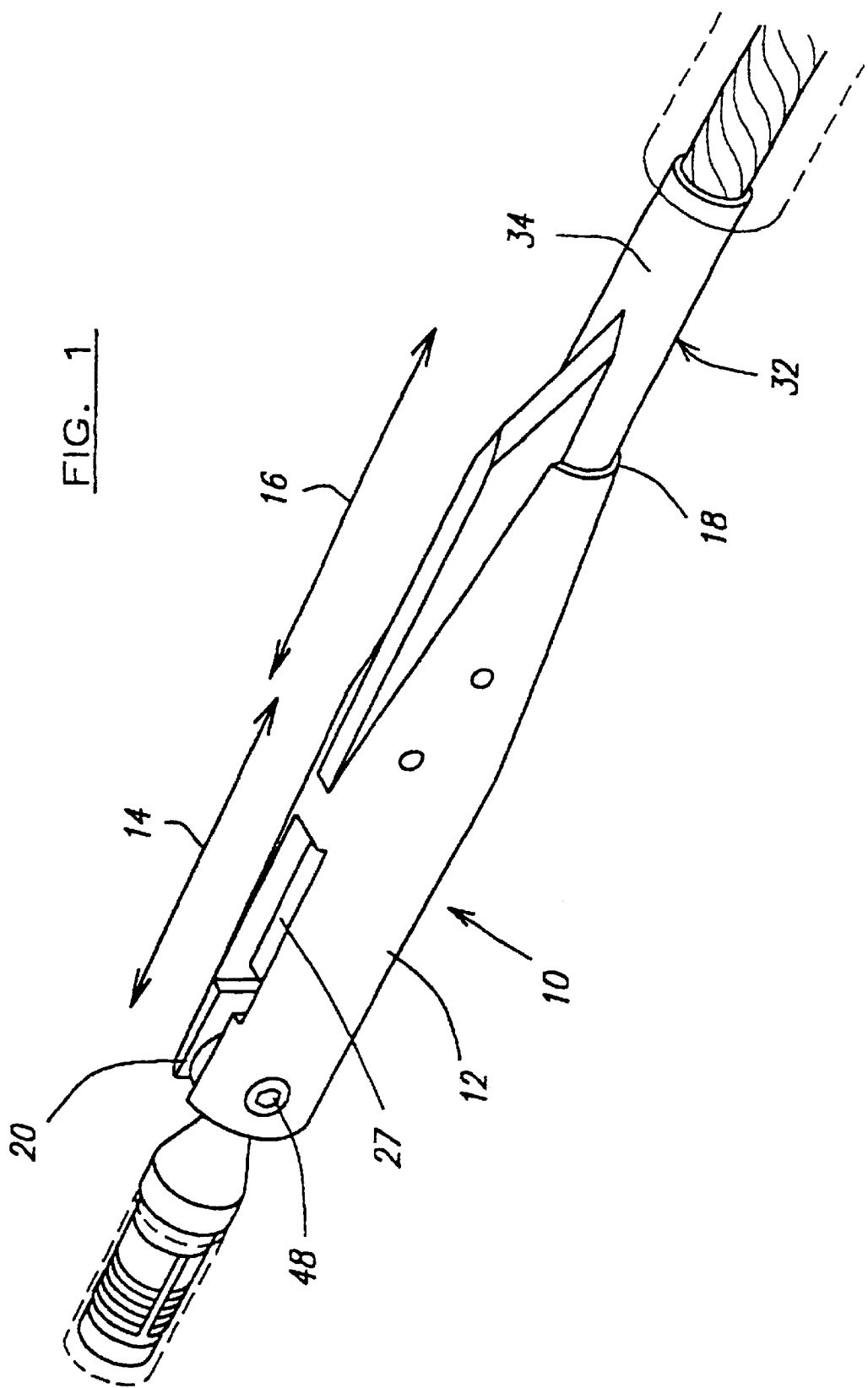
FIG. 1 is a perspective view of a cutting device and cable combination according to and for carrying out the method of the present invention.

In FIG. 1 is shown a cutting device according to the invention. The device is indicated generally by the reference numeral 10, and comprises a body former 12 which is generally cylindrical over a rear section 14 whilst over a front section 16 it is of circular section but of tapering configuration to a small diameter front end 18 lying as shown in FIG. 2 substantially tangentially to the lower side of the rear section 14. The former 12 typically is of steel, and has various borings and cuttings to enable the former to perform its task. Thus, from the rear end, there is a slot 20 lying vertically, and in the slot is received an eye 22 of a wedge coupling device 24 for receiving the replacement pipe 26 to be inserted in place of the existing pipe.

The slot 20 leads to a recess 27 in which is received a ferrule 28 of the pulling cable 30 (to be described in greater detail hereinafter). The recess 28 extends vertically through the former 12 to enable the ferrule 28 to be received therein as shown in a manner whereby the ferrule 28 does not interfere with the smooth outer profile of the rear section 14.

A bore 31 extends through the former 10 from the recess 26 through the front end 18, and in that bore is received a supporting sleeve 32 which extends from the recess 28 out through the front end 18 to provide a projecting portion 34 which extends beyond the front end.

The front end portion 16 has a radial vertical slot 36 which extends to the bore 30, and receives a cutting blade plate 38 of the configuration shown in FIG. 2, which is provided on its front end with a cutting edge 40 lying at an angle to the general length direction of the device 10.

Reverting to the coupling device 24, this comprises, as is conventional, a threaded shaft 42 on the rear end of which is threaded a cone plug 44, and surrounding the cone plug 44 are displaceable chuck sections 46 which splay outwardly in a wedging fashion as the plug 44 is threaded towards the eye end 22 of the threaded shaft 42. This outward splaying of the chuck portions 46 effects a wedging grip on the replacement pipe 26 so that as the whole device is pulled forward, so the replacement pipe 26 will be pulled along with a device into the location where the replacement pipe is to lie, but the device can be easily removed by unscrewing the cone plug 44.

The eye 22 is connected to the teat end of the device by means of a through bolt 48.

In the use of the device, cable 30 is threaded into the device through the recess 27 and then through the passage 31 until the ferrule 28 takes up the position shown. The sleeve 32 may be added after this threading operation by being threaded onto the cable 30 from the front end thereof.

The cable 30 is then fed into the bore 50 of the existing underground pipe 52 which as shown in FIG. 2 is located in the ground 54. Reference number 56 represents the edge of an excavation prepared for receipt of the device in the position shown.

At the remote end of the pipe 52 (not shown), the leading end of the cable 30 is exposed and is pulled by means of a winch firmly in the direction of the arrow 58. The device 10 therefore is pulled towards and along the line of the pipe 52, and as it is so pulled, firstly the blade with the cutting edge 40 cuts a longitudinal slit 59 in the pipe 52 as shown in FIG. 3.

As the device moves progressively along the line of the pipe 52, so the pipe 52 is spread progressively as shown in sequence in FIGS. 4 and 5. This is achieved by the configuration former 12, and in the final event, the replacement pipe 26 is eventually placed in position along the line of the previous pipe 52 as shown in FIG. 5. The device 10 is eventually pulled into another excavation at the end of the length of pipe 52 to be replaced, and the clamping device 24 is removed, leaving the new replacement pipe 26 exactly in position. Appropriate finishing operations may be prepared on the ends of the pipe 26 including for example the attachment of unions or couplings.

An effective and simple ferrule/stop tap excavation is therefore performed, and a significant feature is that the cable 30 should be a relatively neat fit inside the pipe 52 so that it does not snag due for example to the pipe 52 having other than a completely straight profile. In practise it is found that pipes such as pipe 52, which are of lead do in fact weave from side to side and up and down as a result of the installation methods adopted, or as a result of soil movements with the passage of time. The ferrule 28 is located to the rear of the cutting edge and therefore before the ferrule 28, which is of larger size than the diameter of the cable 30 enters the passage created by the cutting, that passage is of sufficient size so that the ferrule will not cause any obstruction. This contrasts with the arrangement of known cutting devices wherein the pulling cable is attached to the front end of the device, and the cutter is rearwards of that connection. With the known arrangement, it is only possible to use towing cables which are much smaller than the bore size of the pipe being cut, and therefore the conventional method is only useful with pipes of a much greater diameter.

The ferrule 28 may be applied by looping the rear end of the cable 30 and by applying the ferrule around the region where the end of the loop lies adjacent the body of the cable, and after the ferrule has been applied, the loop can be removed, but any other means may be provided for applying the ferrule, or applying another component which performs the same function as the ferrule 28. That function is that the ferrule pushes on a shoulder region 64 of the recess 26 so that in effect the forward section 16 of the device is pushed into and along the existing pipe 52 as opposed to being pulled as it would be if the connection were at the front of the device and ahead of the cutting blade 40.

The cutting blade 40 is removable in that it is held in position by a pair of pins 66 and 68, and it rests on the sleeve 32 so that during the cutting the reaction forces which are applied to the blade are born by the sleeve 32 and not by the cable 30.

FIG. 6 shows a typical location where the invention may be applied, and in FIG. 6 reference numeral 70 represents a highway or carriageway for vehicles, reference numerals 72 and 74 represent walk ways to opposite sides of the carriageway 70, and reference numeral 76 represents domestic dwellings to opposite sides of the carriageway. A mains water pipe 78 may typically lie to one side of the carriageway 70 for example under the walkway 74, and service pipes, to be replaced, extend from the mains line 78 as shown at 80 for long reach service pipes, and 82 for short reach service pipes.

It is not unusual to simply dig up and replace the short reach pipes 82, although the invention can be applied for replacing these pipes, but in the case of the long reach pipes it can be seen that digging up and replacing would cause considerable disruption. As the invention provides that replacement can take place without full excavation, it is of particular advantage for the replacement of the long reach sections 80.

Typically, to replace a long reach section 80 excavations would be prepared at regions 84, 86 and 88, region 84 being at the junction between the service pipe 80 and the main pipe 78, region 86 being in the area of the stopcock for the domestic dwelling, and 88 being at the junction between the service pipe 80 and the domestic dwelling.

In order to provide for the threading in of the cable 30 into the existing pipe 52 from one excavation to another, further innovative development had to be provided, as it was found to be effectively impossible to feed a cable 30 of sufficient strength into the existing pipe because of the frictional forces. Because of the small sizes, it was not possible to introduce a pilot cable which could be fed in through the existing pipe and which was connected to the cable 30, because a suitable connection could not be made strong enough to take the tensile forces involved one the one hand, and be small enough to pass through the small diameter pipe to be removed on the other hand.

In accordance with another development of the invention a breakthrough on this was achieved by taking a steel multi-strand cable 30 and by paring the leading end portion 90 as shown in FIG. 7 over a length sufficient to enable it to pass through the pipe 52. At the junction 92 between the pared small diameter portion 90, and the remainder of the cable, the cut strands were fixed and smoothed by brazing or soldering. Such a step provides a cable member with a small diameter pilot section, which can be fed through the existing pipe 52 yet maximises the tensile strength capabilities of the cable.

In fact it was found that it was still quite difficult to feed the section 90 through the pipe 52 because of its relatively flexible nature, and snagging still occurred, but this was overcome by a further advantageous step of providing a plastic cover tube 94, of outer diameter no greater than that of the remainder of the cable 30, over the reduced diameter section 90 thus reducing friction before that section was fed through the pipe 52.

These steps individually and together constitute a novel process and means for the achievement of the placement of the cable 30 in the pipe 52 to enable the slitting and replacement pipe operation previously described to be effected.

It is still not completely straightforward to introduce the cable 30 into the pipe 52, because of its relatively neat fit therein, and further measures were effected.

Specifically, in the insertion of the cable 30, the section 90 with the plastic tube 94 thereon could be fed through by hand until the leading end thereof emerged from the downstream excavation. A sufficiently surplus length of the reduced section 90 is utilised to enable it to be attached to a torque regulated winch, of conventional construction, and this winch applied a pulling force on the section 90 with its cover 94. The winch was of a nature to apply only a limited amount of tensile force which was controlled in order to ensure that the small diameter portion 90 did not break during the pulling thereof.

Further feeding force was required, and to enhance the feeding in operation, a device as shown in FIG. 9 was designed and used, and that device comprises a manually operable lever 96 pivotable on a casing 98 about pivot point 100. The lever 96 is connected to a pair of clamp blocks 102 and 104 which lie to opposite sides of the cable 30, and as the lever 96 is swung by hand as indicated by the arrow 105 in an anticlockwise direction in FIG. 9, the blocks 102 and 104 come together, for example by appropriate cam action between the lever and the blocks, to clamp the cable 30 and with continued pivoting movement, to thrust the cable 30 forward in the direction of arrow 106 into the pipe 52. The lever 96 when rocked in the clockwise direction moves the blocks back to the released position shown in full lines and therefore by continued rocking back and forth of the lever 96, the cable 30 is cyclically thrust into the pipe 52. This operates in conjunction with the winch at the other end which is applying a pulling effect on the cable 32 through the reduced diameter portion 90, and by this means the neatly fitting cable 30 is fed into the pipe 52 and out of the forward end. With the thicker portion of the cable 30 now in position, the winch can engage same and be reset to apply a much higher pulling force in order to pull the device 10 along the line of the pipe 52 to slit and spread same as described herein and as illustrated in FIGS. 3, 4 and 5.

The invention in its various aspects provides an extremely efficient and effective means of slitting and spreading small bore underground pipes and replacing them with replacement pipes, without excavation and with the added benefit of being an on-line line replacement, thus elevating the risk of causing potential damage to other underground apparatus. Such process has not heretofore been commercially available.

The former shown is provided only with a single cutting blade 38, but in an alternative design there may be two or more cutting blades which are angularly offset and may for example be diametrically opposed.

Should it be that the device 10 in being pulled along the line of pipe 52 meets an obstruction such that the pipe 52 is in fact forced out of the other end of the excavation, is useful to provide a splitting cone device for example shown in FIG. 8 at such other end in order to split the pipe 52 as it emerges along with the cable 30, and such a device shown in FIG. 8 comprises simply a cone body 110 on which are provided two diametrically opposite cutting blades 112, 114 which slice into the pipe 52 as it emerges, at diametrically opposite locations, and the pipe 52 splits into two halves 52A and 52B thereby to clear the cable 30 which can be wound up for further use, and the split halves of the pipe 52 can be discarded or otherwise disposed of.

The invention provides an extremely useful method of existing pipe replacement, and although not considered to be limiting, typically the cable 30 may be in the order of 8 mm diameter, and the typical length of pipe to be cut and replaced might be in the order of 17 meters. A service lead water pipe to be replaced may be in the order of 1", ¾", ½" or ⅜" diameter, with a varied wall thickness. The pared portion 90 of the cable may be in the order of 2–5 mm, and so it can be seen that in a main area of application the invention is dealing with pipes of very small size.

The devices of FIGS. 8 and 9 form separate inventions in relation to which the Applicant reserves the right to make separate independent claims.

The advantage of the method described is that it keeps the size of excavation down to an absolute minimum, and the way in which the system is designed to be used an to operate means that damage to other underground apparatus (Water, Gas, Electric, Drains and Telecommunications mains and services) is eliminated or kept to a minimum.

What is claimed is:

1. A method of replacing an existing pipe underground pipe with a replacement pipe by pulling a cutting device comprising a cutting blade and a former through the existing pipe from one end of the pipe to the other by pulling on a leading end of a towing cable of which the trailing end is connected to the former, the former having a rear end to which the replacement pipe is attached and a front end which is pulled through the existing pipe ahead of the rear end so that the blade slits the existing pipe and the former spreads the slit pipe, to enable the new pipe to be inserted, and wherein, to enable the cutting of small diameter pipes, the pulling force on the cutting device is transmitted exclusively through a ferrule on the towing cable trailing end by seating the ferrule on a shoulder defined in a recess in the former at a position to the rear of the cutting blade.

2. A method according to claim 1, including coupling the end of the cable to the former by threading the cable through the recess and then through a passage in the former leading from the front end to the recess, until the ferrule seats on the shoulder of the recess and the cable emerges from the front end of the former.

3. The method according to claim 2, including the step of providing a rigid, reaction supporting sleeve inside the passage.

4. Apparatus for replacing an existing underground pipe with a replacement pipe by pulling the apparatus through the existing pipe by means of a towing cable, which includes a cutting device comprising a former and a cutting blade, the blade serving to slit the existing pipe and the former to spread the slit pipe as the former is pulled along the line of the existing pipe by the towing cable which is threaded into the existing pipe, the new pipe being inserted by being attached to the rear of the former, wherein, to enable the cutting of small diameter pipes, the pulling force on the cutting device is transmitted exclusively through a ferrule on the towing cable trailing end which seats on a shoulder defined in a recess in the former at a position to the tear of the cutting blade.

5. Apparatus according to claim 4, wherein the former has a passage leading from the front end to the recess, so that the cable can be coupled to the former by being threaded through the recess and then the passage until the ferrule seats on a shoulder of the recess.

* * * * *